(12) United States Patent
Jung

(10) Patent No.: US 9,807,470 B2
(45) Date of Patent: Oct. 31, 2017

(54) CONTENT PROCESSING APPARATUS AND METHOD FOR PROVIDING AN EVENT

(71) Applicant: SAMSUNG ELECTRONICS CO., LTD., Suwon-si (KR)

(72) Inventor: Tae-ung Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/573,274

(22) Filed: Dec. 17, 2014

(65) Prior Publication Data

US 2015/0264450 A1 Sep. 17, 2015

(30) Foreign Application Priority Data

Mar. 14, 2014 (KR) .................... 10-2014-0030454

(51) Int. Cl.
 *H04N 7/10* (2006.01)
 *H04N 7/025* (2006.01)
 (Continued)

(52) U.S. Cl.
 CPC ..... *H04N 21/8133* (2013.01); *H04N 21/2353* (2013.01); *H04N 21/23418* (2013.01);
 (Continued)

(58) Field of Classification Search
 CPC ........... H04N 21/8133; H04N 21/4126; H04N 21/44008; H04N 21/4532; H04N 21/4722; H04N 21/47815; H04N 21/485; H04N 21/23418; H04N 21/2353; H04N 21/4755; H04N 21/812
 See application file for complete search history.

(56) References Cited

U.S. PATENT DOCUMENTS

2007/0083887 A1 4/2007 Gutta et al.
2008/0066099 A1* 3/2008 Brodersen ......... G06F 17/30038
   725/35
(Continued)

FOREIGN PATENT DOCUMENTS

EP 2 081 385 A2 7/2009
EP 2 704 444 A1 3/2014
(Continued)

OTHER PUBLICATIONS

Communication dated Jun. 22, 2015 issued by the European Patent Office in counterpart European Patent Application No. 15155020.9.
(Continued)

*Primary Examiner* — Yassin Alata
(74) *Attorney, Agent, or Firm* — Sughrue Mion, PLLC

(57) ABSTRACT

A method and apparatus for providing an object corresponding to output content are provided. The method includes outputting content on a screen, extracting a fingerprint of the content at predetermined time intervals, transmitting the extracted fingerprint to a server, receiving event information related to the content, and in response to an output mode being set as a first mode, displaying an object corresponding to the content on the screen, and in response to the output mode being set as a second mode, displaying additional information of the object corresponding to the content on the screen.

18 Claims, 8 Drawing Sheets

(51) Int. Cl.
    *H04N 21/81* (2011.01)
    *H04N 21/41* (2011.01)
    *H04N 21/44* (2011.01)
    *H04N 21/45* (2011.01)
    *H04N 21/4722* (2011.01)
    *H04N 21/478* (2011.01)
    *H04N 21/485* (2011.01)
    *H04N 21/234* (2011.01)
    *H04N 21/235* (2011.01)
    *H04N 21/475* (2011.01)

(52) U.S. Cl.
    CPC ... *H04N 21/4126* (2013.01); *H04N 21/44008* (2013.01); *H04N 21/4532* (2013.01); *H04N 21/4722* (2013.01); *H04N 21/4755* (2013.01); *H04N 21/47815* (2013.01); *H04N 21/485* (2013.01); *H04N 21/812* (2013.01)

(56) References Cited

U.S. PATENT DOCUMENTS

2008/0320546 A1* 12/2008 Moon ............... H04N 7/17318
    725/136

2011/0106615 A1* 5/2011 Churchill ............... G06Q 30/02
    705/14.49
2012/0183229 A1* 7/2012 Mcdevitt .......... H04N 21/47815
    382/218
2013/0347018 A1 12/2013 Limp et al.

FOREIGN PATENT DOCUMENTS

WO      01/72040 A2      9/2001
WO      wo-01/72040      *      9/2001

OTHER PUBLICATIONS

Communication dated Aug. 24, 2016 issued by the European Patent Office in counterpart European Patent Application No. 15155020.9.
Communication dated Jun. 13, 2017, issued by the European Patent Office in counterpart European Patent Application No. 15155020.9.

* cited by examiner

CONTENT PROCESSING APPARATUS AND METHOD FOR PROVIDING AN EVENT

CROSS-REFERENCE TO RELATED APPLICATION(S)

This application claims priority under 35 USC §119(a) from Korean Patent Application No. 10-2014-0030454, filed on Mar. 14, 2014, in the Korean Intellectual Property Office, the entire disclosure of which is incorporated herein by reference for all purposes.

BACKGROUND

1. Field

Apparatuses and methods consistent with exemplary embodiments relate to a content processing apparatus and a method, and more particularly, to a content processing apparatus and method which provide event information along with content.

2. Description of Related Art

As user needs are diversified, a source of broadcast content or multimedia content has varied from a single source such as airwaves to various sources such as cable, Internet Protocol Television (IPTV), Video On Demand (VOD), and the like. For example, sources providing event information like a customized advertisement or a program recommendation have been recently designed.

To improve a user's experience, it would help if object information was provided appropriately so as to be suitable for a displayed scene. For example, an advertisement message for a certain product may appeal to a greater amount of people at a time when the message is displayed along with a scene in played content at which the product is exposed.

However, in a related apparatus, it is difficult to provide object information appropriately because the related apparatus requires a user manipulation to display detailed information of the object information. As a result, a content scene related to the object information may be changed to an irrelevant scene during the process of user interaction. In addition, the object information is typically provided in a standardized manner, and thus, is not capable of satisfying various user interests.

SUMMARY

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

An aspect of the exemplary embodiments provides a content processing apparatus and method which provide object information efficiently along with content.

According to an aspect of an exemplary embodiment, there is provided a method of providing an object of content that includes outputting content on a screen, extracting a fingerprint from the content at predetermined time intervals, transmitting the extracted fingerprint to a server, and receiving information corresponding to the content, and in response to an output mode being set as a first mode, displaying an object corresponding to the content on the screen, and in response to the output mode being set as a second mode, displaying additional information of the object corresponding to the content on the screen.

In response to a user agreement with respect to the object being received, the method may further include displaying the additional information by changing the object to the additional information on the screen.

In response to a user agreement with respect to the object being received, the method may further include transmitting the additional information of the object to a user terminal device.

The output mode may be set based on the output content.

The output mode may be set based on at least one of a channel providing the content, a genre of the content, and a user who watches the content.

In response to the content being changed, the method may further include displaying a user interface (UI) for receiving a setting of the output mode, and in response to the event output mode being set through the UI, storing information of a set mode.

The method may further include checking a skip flag included in the information corresponding to the content, and in response to a first value being recorded in the skip flag, displaying the object regardless of the output mode, and in response to a second value being recorded in the skip flag, displaying the additional information regardless of the output mode.

The method may further include automatically setting the output mode based on a setting history of the output mode.

The object corresponding to the content may include an image of an item included on the screen of the displayed content, a message for inquiring whether to check for additional information of the item, a first menu for inputting a user agreement with respect to the object, and a second menu for deleting the object.

The additional information may include detailed information of the item included on the screen of the displayed content and information of at least one another item which belongs to a same category as the item.

According to an aspect of another exemplary embodiment, there is provided a content processing apparatus which includes a signal processor configured to extract a fingerprint of content output on a screen at predetermined time intervals, a communication unit configured to transmit the extracted fingerprint to a server and receive information corresponding to the content, and a controller configured to, in response to an output mode being set as a first mode, display an object corresponding to the content on the screen, and in response to the output mode being set as a second mode, display additional information of the object corresponding to the content on the screen.

In response to a user agreement with respect to the object corresponding to the content being received, the controller may display the additional information by changing the object to the additional information on the screen.

In response to a user agreement with respect to the object corresponding to the content being received, the controller may be configured to transmit the additional information of the object corresponding to the content to a user terminal device.

The output mode may be set based on the output content.

The output mode may be set based on at least one of a channel providing the content, a genre of the content, and a user who watches the content.

The apparatus may further include a storage configured to store a setting of the output mode. In response to the content being changed, the controller may be configured to display a user interface (UI) for receiving a setting of the output mode, and in response to the output mode being set through the UI, store information of a set mode.

The event information may include a skip flag. The controller may be configured to check the skip flag, and in response to a first value being recorded in the skip flag, display the object regardless of the output mode, and in response to a second value being recorded in the skip flag, display the additional information regardless of the output mode.

The controller may be configured to set the output mode automatically based on a setting history of the output mode.

The object may include an image of an item included on the screen of the content, a message for inquiring whether to check additional information of the item, a first menu for inputting a user agreement with respect to the object, and a second menu for deleting the object.

The additional information may include detailed information of the item included on the screen and information of at least one other item which belongs to a same category as the item.

According to an aspect of another exemplary embodiment, there is provided a content processing apparatus including a processor configured to extract a fingerprint from video content that is currently being displayed on a screen, a communicator configured to transmit the extracted fingerprint to a server, and to receive information about an object being displayed within the content that is currently being displayed on the screen, and a controller configured to provide a user interface on the screen which includes the information about the object within the content.

The video content may comprise a broadcast or multimedia content, and the object displayed within the content may comprise an item from a scene within the video content.

The video content may comprise a broadcast or multimedia content, and the object displayed within the content may comprise an item worn by an actor included within the broadcast or multimedia content.

The information about the object within the content may comprise at least one of an advertisement for the object, recommendation information regarding a content channel related to object, and information for receiving a user opinion about the object.

The extracted fingerprint may comprise at least one of edge information of an object within a video frame, a subtitle of the video frame, logo information, and frequency information of an audio signal According to the above various One or more exemplary embodiments provide various types of event information that may be provided appropriately with respect to content, so as to be suitable for a user preference.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
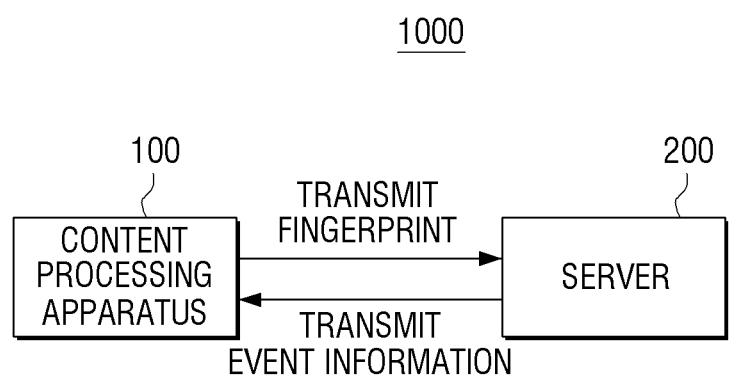
FIG. 1 is a diagram illustrating a content-customized event information providing system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a diagram illustrating a content-customized event information providing system 1000 according to an exemplary embodiment. As shown in FIG. 1, the content-customized event providing system 1000 includes a content processing apparatus 100 and a server 200.

The content processing apparatus 100 may be or may include a set-top box, a TV, a mobile phone, a Personal Computer (PC), a laptop PC, a Personal Digital Assistant (PDA), a tablet PC, and the like, and may be embodied so as to provide a content play back function.

In an example in which the content processing apparatus 100 is a TV, the content processing apparatus 100 may be embodied as an IPTV. The IPTV refers to a bidirectional TV service which is provided through a high-speed internet network, and may be embodied as a form which connects a TV to a content providing server through an internet network, for example, using a set-top box as a medium. In this example, the content processing apparatus 100 may be provided with a pre-manufactured content from the content providing server. The pre-manufactured content may include a VOD content, a premium VOD content, a broadcast content, an internet content, a local file, an external content connected through Digital Living Network Alliance (DLNA), and the like.

It should be appreciated that content as described herein is not limited to video content, and may refer to any and all types of displayable contents such as a picture, a still image, a file, broadcast content, multimedia content, and the like.

According to various aspects, while content is output, the content processing apparatus 100 may extract a fingerprint of the content from at least one of a video signal and an audio signal that are included within the content, and transmit the extracted fingerprint to the server 200.

For example, a fingerprint may refer to characteristic data which represents a feature of an audio signal, an image signal, a video signal, and the like, and which may reflect an intrinsic feature of a signal itself, unlike meta data that is based on a text. The fingerprint may be may be referred to as fingerprint data, Deoxyribonucleic acid (DNA) data, gene data, and the like. In an example of an audio signal, a fingerprint may be feature data including a frequency or an amplitude of the audio data. In an example of an image signal or a video signal, the fingerprint may be feature data including a video frame, a motion vector of a frame, color information, and the like.

Video fingerprinting and audio fingerprinting methods may be used to extract several unique features of a digital video and audio data that can be stored as a fingerprint of the video content and the audio content, respectively. The evaluation and identification of video content and the audio content may then be performed by comparing the extracted fingerprints. For digital video data, that is, both audio and video fingerprints can be extracted, each having individual significance for different application areas.

The server 200 may communicate with the content processing apparatus 100 through a network such as an internet network, a cable network, a satellite network, and the like. According to various aspects, the server 200 may recognize content which is currently being output based on a fingerprint received from the content processing apparatus 100.

The server 200 may store various contents and fingerprints of the contents by storing the contents and the fingerprints in a database. As another example, the server 200 may receive the contents by communicating with a data providing server. For example, the server 200 may receive contents of each channel from among a plurality of channels in real time from a data providing server. The server 200 may extract fingerprints from the contents received from the data providing server, and store the extracted fingerprints in a database.

Accordingly, the server 200 may recognize a portion of content which is currently being output by detecting a fingerprint matched with the fingerprint received from the content processing apparatus 100 from among the fingerprints stored in the database of the server 200. In response to event information to be provided about a portion of content subsequent to the recognized content, the server 200 may transmit the event information to the content processing apparatus 100.

The event information refers to content-customized information. For example, the event information may include an advertisement related to content which is currently being output, recommendation information regarding a content channel related to the currently output content, opinion collection information for receiving a user opinion regarding the content, and the like.

The content processing apparatus 100 may receive information about a time at which to output event information from the server 200 along with the event information, and include and display the event information with the content at a corresponding time.

In the content-customized event information providing system 1000, the content processing apparatus 100 may receive customized event information corresponding to a content that a user is currently watching in real time by extracting a fingerprint of the content. For example, the fingerprint may be extracted and output at predetermined time intervals and transmitted to the server 200.

Figure 2:
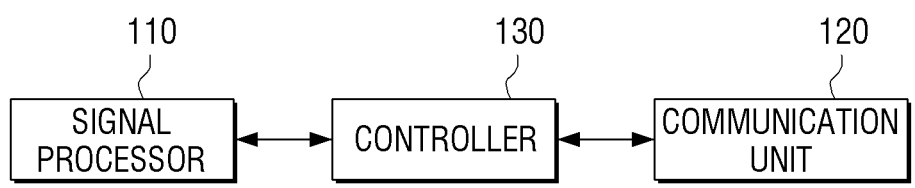
FIG. 2 is a block diagram illustrating a content processing apparatus according to an exemplary embodiment.

FIG. 2 is a block diagram illustrating a content processing apparatus according to an exemplary embodiment.

Referring to FIG. 2, the content processing apparatus 100 includes a signal processor 110, a communication unit 120, and a controller 130.

The signal processor 110 may process various signals including content and may output the signals to a content player (not shown). The signal processor 110 may extract a fingerprint from at least one of a video signal and an audio signal of content at predetermined time intervals, during a process in which the content is output.

The signal processor 110 may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors According to various aspects, as a non-limiting example a fingerprint may include at least one of a video frame, edge information of an object included in the video frame, a subtitle included in the video frame, logo information, frequency information of a section in an audio signal, an audio signal peak information on the section of the audio signal, and the like.

The signal processor 110 may extract a fingerprint using various conventional methods. The signal processor 110 may divide an audio signal into time intervals, and calculate a size of a signal of a frequency included in each time interval. The signal processor 110 may calculate a frequency slope by obtaining a size difference of signals of an adjacent frequency section. For example, the signal processor 110 may generate a fingerprint by quantizing a frequency slope which is a positive number to 1, and quantizing a frequency slope which is a negative number to 0. As another example, the signal processor 110 may generate a fingerprint of a video signal using edge information, a motion vector, color information of an object included in a plurality of frames constituting the video signal, and the like.

The communication unit 120 may connect the apparatus to the server 200 through a network, and transmit/receive various data. For example, the communication unit 120 may transmit a fingerprint which is extracted at predetermined time intervals by the signal processor 110 to the server 200, and receive event information related to content. In this case, the communication unit 120 may receive information about a time at which to output the event information, along with the event information.

In some examples, the event information received by the communication unit 120 may include a skip flag. The skip flag includes a certain value which the content processing apparatus 100 may refer to. For example, the content processing apparatus 100 may skip a display of an object about the event information based on a value recorded in the skip flag, and determine whether to display detailed information of the event information immediately. Examples of the skip flag, the object regarding the event information, and the detailed information of the event information are described below in further detail.

The controller 130 controls overall operations of the content processing apparatus 100. For example, in accordance with a setting of an event output mode, the controller 130 may control a display of the event information which is displayed on a side of or next to content on a screen.

The event output mode according to various examples may include a first mode and a second mode. In response to the event output mode being set as the first mode, the controller 130 may display an object about the event information next to or on a side of the content, and in response the event output mode being set as the second mode, may display an event which includes detailed information of the event information next to or on a side of the content. As another example, the object and the event information may be displayed on top of or over the content.

Hereinafter, a display of the event information according to the first mode and the second mode is described with reference to FIGS. 3 and 4.

Figure 3:
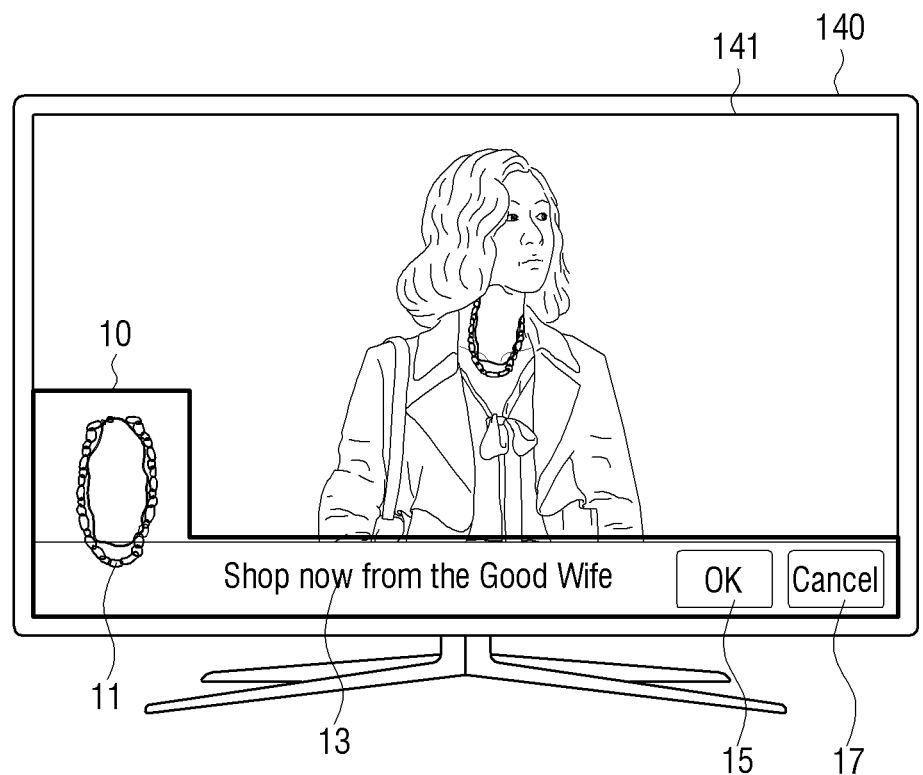
FIGS. 3 and 4 are diagrams illustrating a display state of event information in accordance with an event output mode according to an exemplary embodiment.

Referring to FIG. 3, the content processing apparatus 100 may include or may be connected to a display 140. In some examples, the content processing apparatus 100 may provide the display 140 with content without including a content play back function.

For example, in response to the event output mode being set as the first mode, the controller 130 may control the display 140 to display a content screen 141 and an object 10 which in this example is displayed on a side of the content screen 141, partially overlapping a content scene in which the event information is provided.

The object 10 may perform a role of a message for guiding a user to detailed information about an item included in the object 10, and a mode in which the object 10 is displayed may be referred to as a prompt mode. As an example, the object 10 may include an item image 11 included in the content screen 141, a text message 13 inquiring as to whether to check detailed information of the item image, a first menu 15 for inputting a user agreement with respect to the object 10, and a second menu 17 for deleting the or otherwise cancelling the object 10.

For example, the item image 11 may include an image of an accessory that an actor/actress wears during a scene of the content which is currently being output. In addition, the text message 13 may be a message informing a user or viewer that the user is able to purchase the accessory that the actor/actress is wearing.

In response to the second menu 17 being selected, the controller 130 may remove the object 10 which is displayed on a side of the content screen 141. As another example, in response to the first menu 15 being selected, the controller 130 may change the object 10 displayed on a side of the content screen 141 to detailed information about shopping for the accessory. An example of detailed information of the event information displayed in place of the object 10 is described with reference to FIG. 4.

Figure 4:
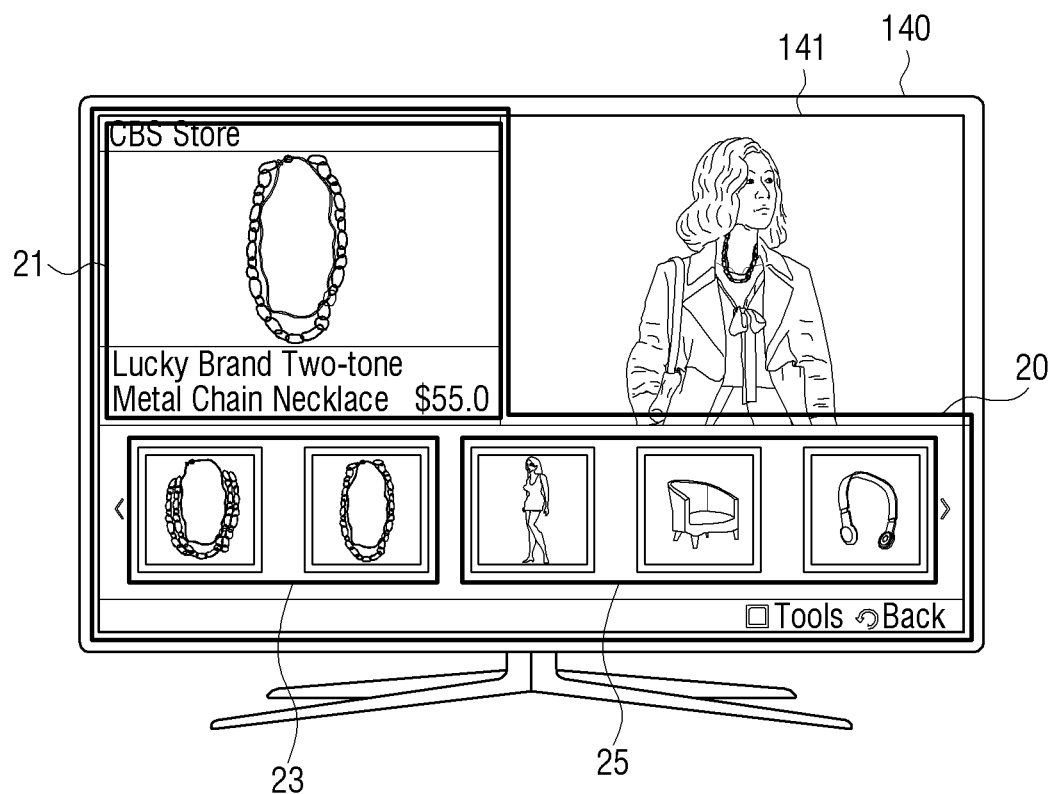

FIG. 4 is a diagram illustrating a display state of detailed information of event information according to an exemplary embodiment.

Referring to FIG. 4, in response to the first menu 15 being selected corresponding to the object 10, for example, as described with reference to FIG. 3, the controller 130 may control the display 140 to display detailed information 20 of the event information on a side of the content screen 141. As another example, in response to the event output mode being set as the second mode, the controller 130 may display the detailed information 20 of the event information on a side of the content screen 141 immediately without displaying the object 10.

For example, the detailed information 20 of the event information may include price information 21 of an item related to the currently displayed content, information 23 of at least one another item that belongs to the same category as the item related to the currently displayed content, recommendation information 25 regarding another item which matches the item related to the currently displayed content, and the like.

According to various aspects, the content processing apparatus 100 has an advantage in that it is capable of designating a type of an event output according to a user preference. For example, in response to a user tendency of desiring to shop for an item of content, the content processing apparatus 100 may set the event output mode as the second mode so that detailed information of the item is provided immediately. As another example, in response to a user tendency of not desiring a content screen that is blocked or impeded with by other objects, the content processing apparatus 100 may set the event output mode as the first mode so that the event information is provided, thereby minimizing the block of the content screen.

Figure 5:
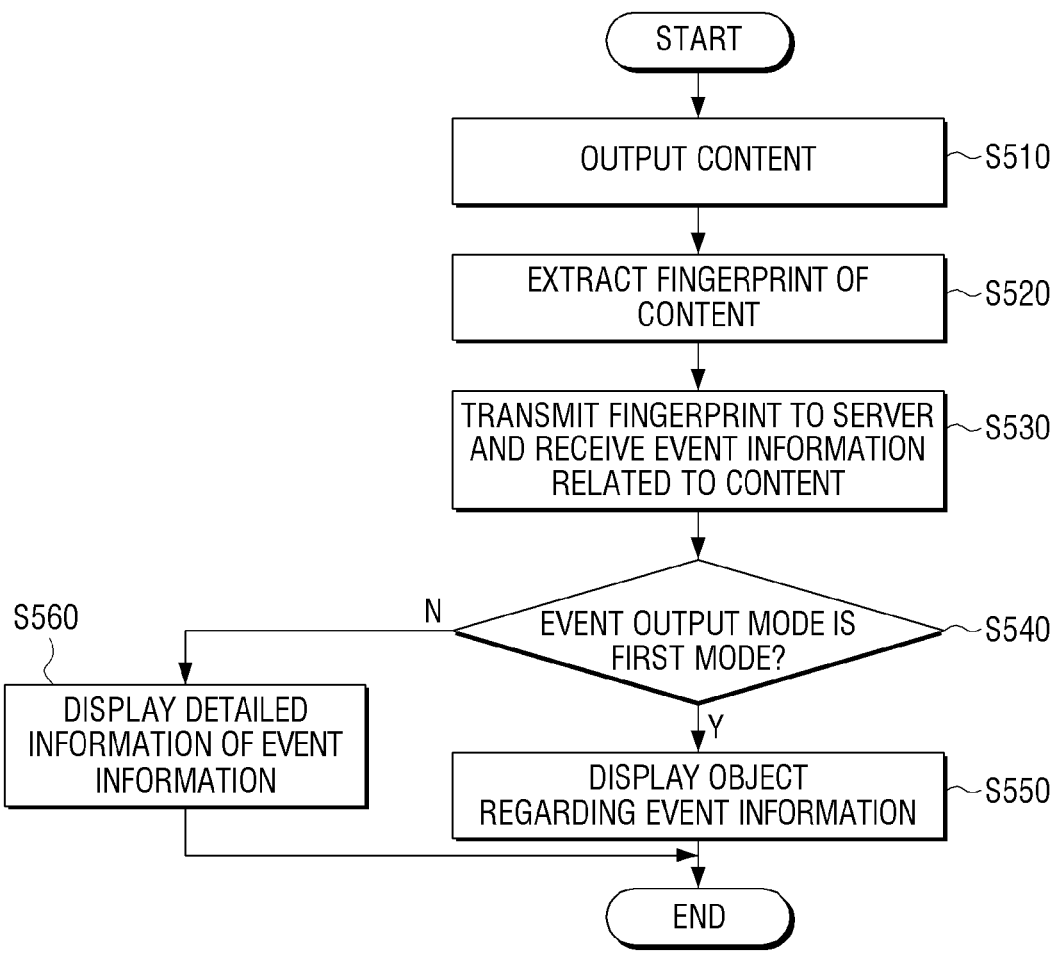
FIG. 5 is a flow chart illustrating a method of providing an event of a content processing apparatus according to an exemplary embodiment.

FIG. 5 is a flow chart illustrating a method of providing an event of a content processing apparatus according to an exemplary embodiment.

Referring to FIG. 5, content is outputted in S510. In a process in which the content is outputted, a fingerprint of the content is extracted at predetermined time intervals, in S520.

The extracted fingerprint may be transmitted to the server 200. For example, a new fingerprint may be extracted at predetermined time intervals from at least one of a video signal and an audio signal of the content, and transmitted to the server 200. The fingerprint may be used to identify what content is currently being output through a fingerprint database of the server 200. For example, a time interval for extracting the fingerprint may be determined by considering a load of data transmission between the content processing apparatus 100 and the server 200 and accuracy in recognizing the content.

The extracted fingerprint is transmitted to the server 200, and event information related to the content is received, in S530. For example, the server 200 may receive and possess the event information related to the content from other data server, or possess the event information autonomously. The server 200 may recognize the content which is currently being output by the content processing apparatus 100 using the fingerprint, and transmit the event information corresponding to the content and the information on time to output the event information to the content processing apparatus 100. For example, the server 200 may receive the fingerprint at predetermined time intervals, and may recognize a change of the content in real time. In response to the changed content being recognized, the server 200 may transmit the event information related to the changed content to the content processing apparatus 100.

The content processing apparatus 100 determines whether the event output mode is the first mode or the second mode, in S540. In response to the event output mode being set as the first mode, the content processing apparatus 100 displays an object about the event information on a screen including the content in S550. Alternatively, in response to the event output mode being set as the second mode, the content processing apparatus 100 displays detailed information of the event information on a screen including the content in S560.

The setting of the first mode or the second mode as described above may be determined by a user selection and may be executed through a setting user interface (UI) screen which is displayed separately from a content screen. As another example, the setting of the event output mode may be executed through a UI displayed on a side of the content screen in the process in which the content is outputted.

Figure 6:
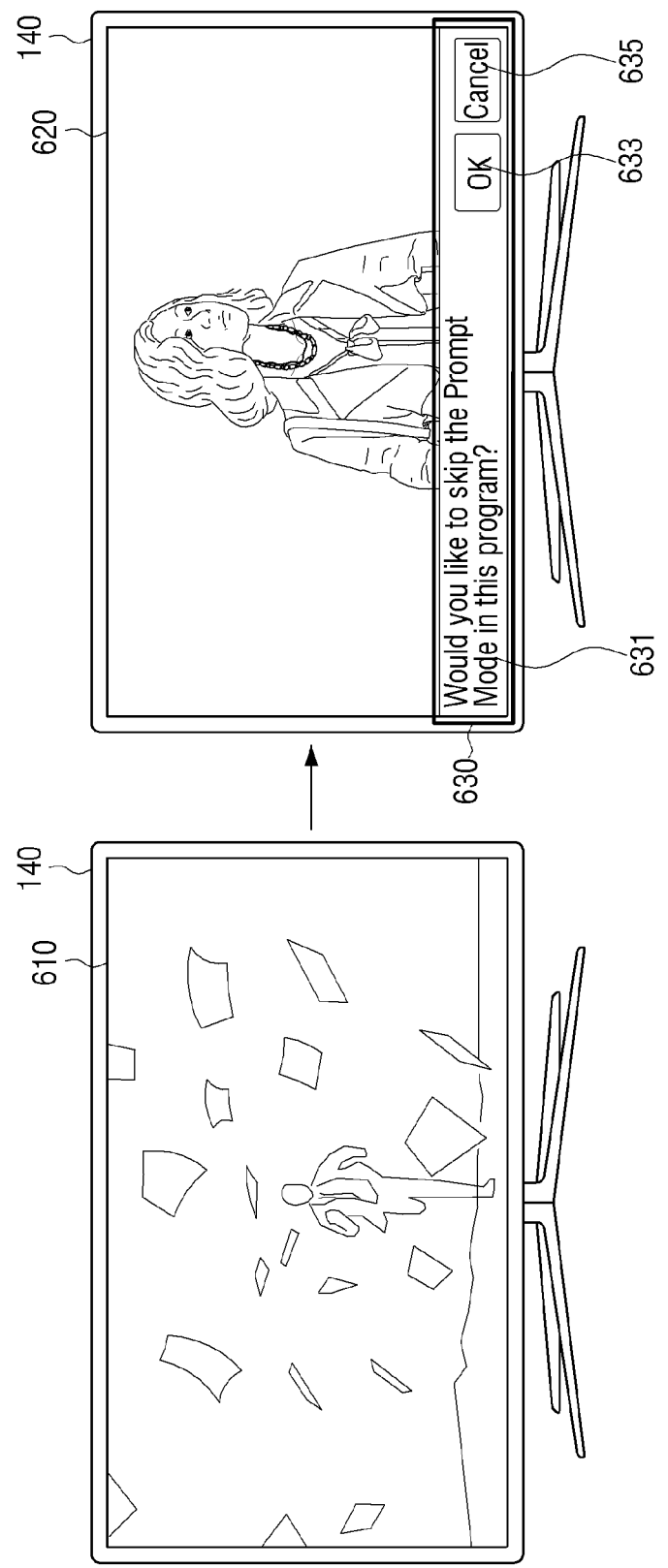
FIG. 6 is a diagram illustrating a user interface (UI) for setting an event output mode according to an exemplary embodiment.

FIG. 6 is a diagram illustrating a user interface (UI) for setting an event output mode according to an exemplary embodiment.

Referring to FIG. 6, in response to a change of a content being output by the display 140 from a first content 610 to a second content 620, the controller 130 may control the display 140 to display a UI 630 for setting an event output mode on a side of a screen in which the second content 620 is displayed.

In this example, the UI is provided in response to the changing of content. In another example, in response to content being recognized for the first time, for example, in response to the display 140 being turned on, the UI 630 for setting the event output mode may be displayed. For example, in response to the display 140 being turned on, the controller 130 may control the display 140 to display the UI 630 for setting the event output mode on a side of a screen in which the recognized content is displayed.

According to various aspects, by analyzing a fingerprint which is extracted and transmitted at predetermined time intervals, the server 200 may recognize that the content changes, and inform the content processing apparatus 100 of the change of the content. For example, the server 200 may recognize that the second content 620 starts, by analyzing the fingerprint transmitted from the content processing apparatus 100. In response to a notification of the change of content being received from the server 200, the content processing apparatus 100 may display the UI 630 for setting the event output mode on a side of the content.

As another example, in response to a user input to change a channel being sensed, the content processing apparatus 100 may recognize the user input as a change of a content, and display the UI 630 for setting the event output mode on a side of the content. As another example, in response to a display apparatus being turned on, as well as in response to a change of a content being recognized, the content processing apparatus 100 may display the UI 630 for setting the event output mode on a side of the content.

For example, the UI 630 for setting the event output mode may include a query text 631 asking whether to skip a display of an object while the second content 630 is output and to display the detailed information of the event information. For example, the query text 631 may be a textual statement inquiring whether to skip a display of an object (prompt mode) with respect to a program which is currently displayed, or may be textual statement inquiring whether to skip a display of an object (prompt mode) with respect to a channel that a user is currently watching. That is, the event output mode may be set on a basis of a program, a channel, or a series of a content.

In addition, the UI 630 for setting the event output mode may include a first button 633 for receiving an authorization to skip a display of an object and a second button 635 for declining to skip the display of the affordance object. In this example, a selection of the first button 633 is the same as the setting of the second mode as described above, and a selection of the second button 635 is the same as the setting of the first mode as described above. Accordingly, each time the content is changed, the controller 130 may display the UI 630 for setting the event output mode.

In response to the event output mode being set through the UI 630, the controller 130 may store information of the set mode in a storage (not shown). That is, while the content is being output, the controller 130 may display the event information by applying the set mode using the information stored in the storage.

As another example, the storage of the content processing apparatus 100 may store a setting value of the event output mode according to a content and a channel, and the controller 130 may display the UI 630 for setting the event output mode on a side of the content with reference to the setting value, only in response to sensing a new content or a new channel to which the event output mode has not been set.

The event output mode may be set individually based on the content. For example, even though there are various sources providing the first content, in response to the event output mode being set as the first mode with respect to the first content and the first content being output through each source, an object may be displayed on a side of a content screen according to the first mode. As another example, even though there are various sources providing the second content, in response to the event output mode being set as the second mode with respect to the first content and the first content being output through each source, detailed information of the event information may be displayed on a side of the content screen according to the second mode.

As another example, the event output mode may be set individually based on a source providing the content. For example, the source providing the content may be a channel providing the content or an input port of the content processing apparatus 100, which provides a content. In this example, in response to the event output mode being set as the first mode with respect to a first channel, the controller 130 may display an object on a side of a content screen with respect to a content which is output from the first channel. As another example, in response to the event output mode being set as the first mode with respect to a universal serial bus (USB) and content received from the USB port being output, the controller 130 may display an object on a side of the content screen.

As another example, the event output mode may be set individually based on a genre of a content or a series of a content. For example, in response to the event output mode being set as the first mode by a user with respect to an entertainment program, the controller 130 may display an object on a side of the content screen in a case in which the first content which is an entertainment program is output and a case in which the second content which is an entertainment program is output.

As another example, the event output mode may be set individually based on the content processing apparatus 100. For example, there may be a plurality of content processing apparatuses under the control of a home network system. The event output mode is set as the first mode with respect to a plurality of content processing apparatus included in a first group, and set as the second mode with respect to a plurality of content processing apparatuses included in a second group. In this example, for all contents which are output through the content processing apparatuses included in the first group, an object may be displayed on a side of a content screen. In addition, for all contents which are output through the content processing apparatuses included in the second group, detailed information of event information may be displayed on a side of the content screen.

As another example, the event output mode may be set individually based on a user who watches content. For example, the content processing apparatus 100 may perform a user authentication function, and manage a plurality of user accounts. In response to the event output mode being set as the first mode for a first user being recognized, an object may be displayed on a side of a content screen according to the first mode with respect to all contents output after the first user is recognized. Alternatively, in response to the event output mode being set as the second mode for a second user being recognized, detailed information of event information may be displayed on a side of the content screen according the second mode with respect to all contents output after the second user is recognized.

As another example, the controller 130 may set the event output mode automatically based on a setting history of the event output mode. For example, the setting history may include a log regarding the event output mode which is set based on a content, a genre of the content, a user, and the like.

For example, in response to determining a history in which the event output mode is set as the first mode more than three times with respect to the first content according to an analysis of the setting history, and the first content is output, the controller 130 may not display a UI for receiving a setting of the event output mode, and may display an object on a side of the content screen automatically according to the first mode.

As another example, in response to determining histories that the event output mode is set as the first mode with respect to the first, second, and third content which belongs to a genre of an entertainment program, the event output mode may be set as the first mode with respect to the fourth content which belongs to a genre of an entertainment program. In this example, the controller 130 may display an object on a side of a screen of the fourth content automatically according to the first mode without displaying a UI for receiving a setting of the event output mode.

That is, in response to determining that the same mode setting is executed more than a predetermined number of times with respect to a certain content or a certain content genre being made according to the analysis of the setting history, the controller 130 may set the event output mode automatically.

In the aforementioned exemplary embodiments, the event output mode may be set according to a user intention. As another example, according to another exemplary embodiment, the event output mode may be changed by information transmitted from the server 200.

Figure 7:
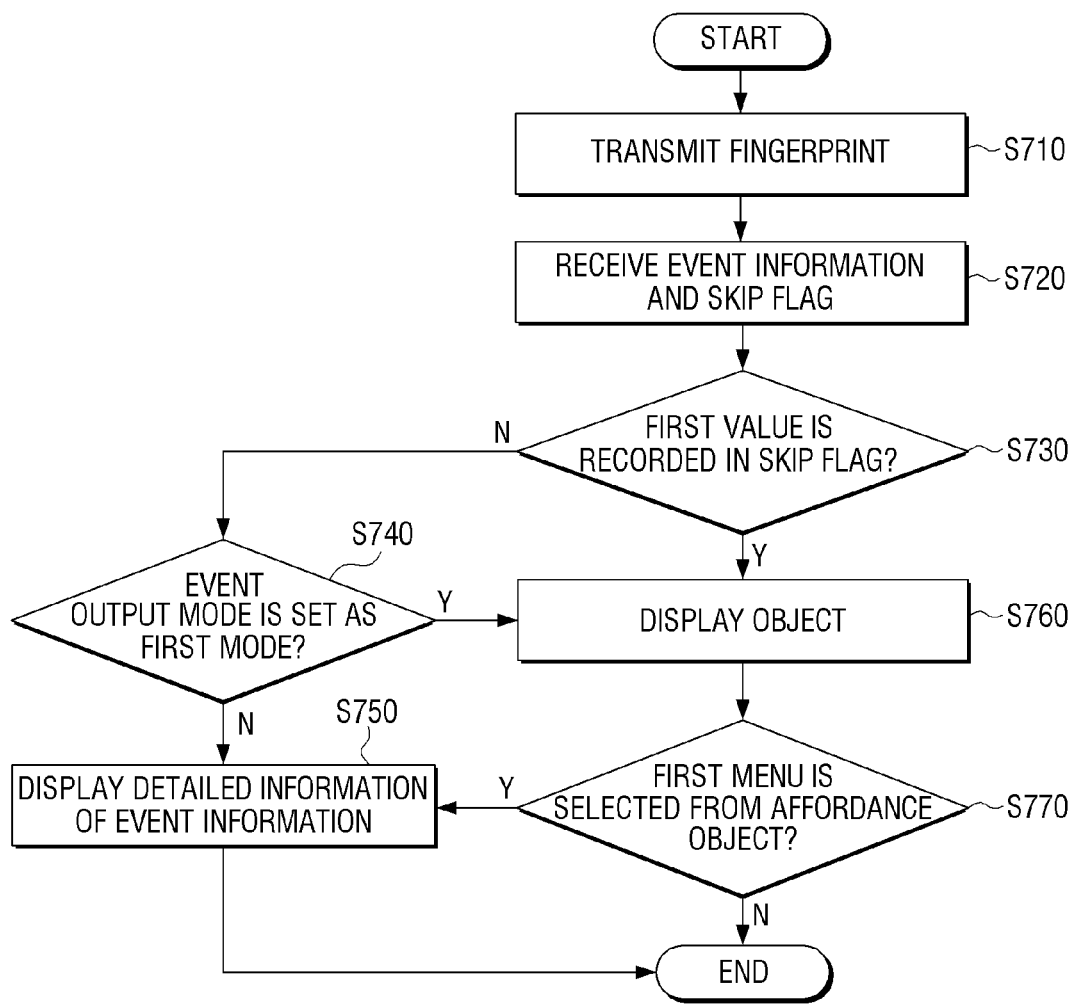
FIG. 7 is a flow chart illustrating a method of providing an event of a content processing apparatus according to another exemplary embodiment.

FIG. 7 is a flow chart illustrating a method of providing an event of a content processing apparatus according to another exemplary embodiment.

Referring to FIG. 7, a fingerprint of a content which is output by the content processing apparatus is extracted at predetermined time intervals, and is transmitted to a server in S710. The description for this process is the same as the above description, and thus, another detailed description is omitted.

The content processing apparatus 100 receives the event information and a skip flag included in the event information from the server 100, in S720. The skip flag includes a value to which the content processing apparatus 100 may refer. For example, a first value and a second value may be recorded in the skip flag, and the content processing apparatus 100 may perform different operations based on whether the first value is referred to or the second value is referred to. For example, according to a value recorded in the skip flag, the content processing apparatus 100 may determine whether to display detailed information of the event information immediately by skipping a display of an object regarding the event information.

For example, the content process 100 checks the skip flag included in the event information, and determines whether the first value is recorded in the skip flag, in S730. In response to the skip flag not including the first value, that is, in response to the skip flag including the second value, the content processing apparatus 100 determines whether the event output mode is set as the first mode, in S740. In response to the event output mode not being set as the first mode, that is, in response to the event output mode being set as the second mode, the controller 130 displays the detailed information of the event information on a side of a content screen, in S750, and in response to the event output mode being set as the first mode, the controller 130 displays an object on a side of the content screen, in S760.

In response to a determination that the first value is recorded in the skip flag in S730, the controller 130 displays an object on a side of the content screen, in S760. That is, in response to a determination that the first value is recorded in the skip flag, the controller 130 may display an object on a side of the content screen regardless of an existing setting of the event output mode.

After S760, in response to determining that a first menu is selected from the object, in S770, the controller 130 displays the detailed information of the event information on a side of the content screen, in S750. For example, referring again to FIG. 3, the first menu may refer to the first menu 15 included in the affordance object 10.

In the aforementioned exemplary embodiment, in response to the first value being recorded in the skip flag, the controller 130 may display the object regardless of the existing setting. According to another exemplary embodiment, in response to the first value being recorded in the skip flag, the controller 130 may display the detailed information of the event information regardless of the existing setting. In these examples, a content provider or a manufacturer related to the event information, as well as a user, may designate a display form of the event information to be provided to the user by using the skip flag included in the event information. Thus, it is possible to increase an advertising effect of a product from a point of view of a content provider or a manufacturer.

Figure 8:
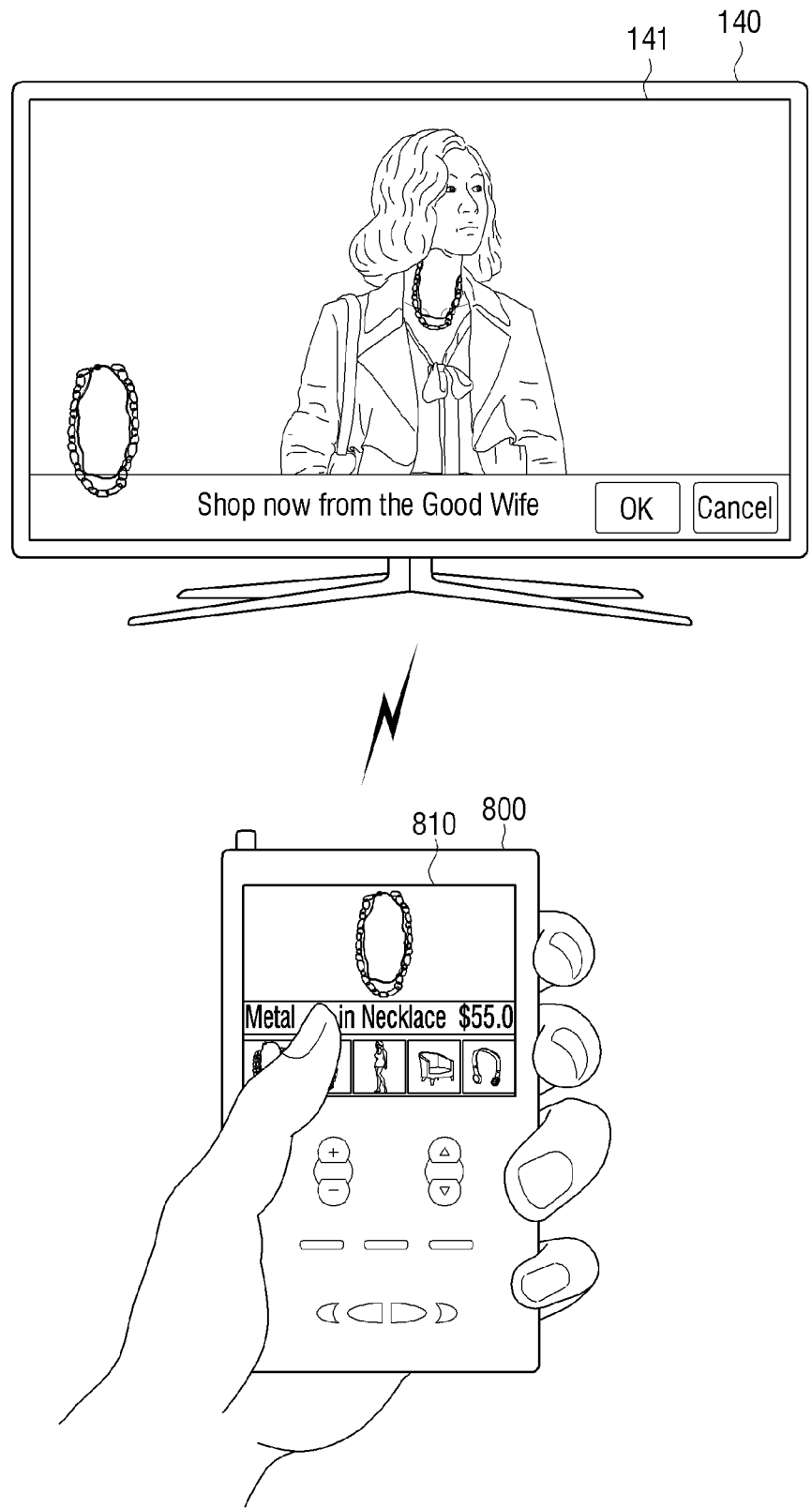
FIG. 8 is a diagram illustrating a method of providing an event of a content processing apparatus according to another exemplary embodiment.

FIG. 8 is a diagram illustrating a method of providing an event of a content processing apparatus according to another exemplary embodiment.

Referring to FIG. 8, the object 10 is displayed on a side of the content screen 141 output from the display 140. In response to an input of a user selecting the object 10, that is, in response to the first menu 15 being selected (shown in FIG. 3), the controller 130 may transmit the detailed information of the event information to a user terminal device 800. Accordingly, the detailed information of the event information may be displayed on a screen of the user terminal device 800. In this example, the user terminal device 800 may be embodied as various devices such as a TV remote controller, a mobile phone, a tablet, a touch pad, and the like.

That is, in the present exemplary embodiment, unlike the previously described exemplary embodiments, the detailed information of the event information may be output on the screen 810 of another user terminal device 800, instead of being displayed on a side of the content screen output from the display 140. Thus, the user is able to check the detailed information of the event information without being interrupted by a block of a content screen 141.

A method of providing event information of the content processing apparatus according to the aforementioned various exemplary embodiments may be coded as software. The software may be recorded in a non-transitory computer readable medium, and used for a device such as a display device or an eyeglasses device.

The non-transitory computer recordable medium refers to a medium which may store data permanently or semi-permanently rather than storing data for a short time such as a register, a cache, and a memory and may be readable by an apparatus. Specifically, the above-described various applications and programs may be stored in the non-transitory computer recordable medium like a compact disc (CD), a digital versatile disk (DVD), a hard disk, a Blu-ray disk, a universal serial bus (USB), a memory card, and a read-only memory (ROM), and the like, and provided therein.

As given above, although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. A method of providing an object of content in a display apparatus, the method comprising:
   receiving a setting of an output mode of information received from a server;
   outputting content on a screen of the display apparatus;
   extracting, by the display apparatus, automatically a fingerprint from the content at predetermined time intervals;
   transmitting, by the display apparatus, the extracted fingerprint to the server;
   receiving, by the display apparatus, from the server, information corresponding to the content based on the transmitted fingerprint, wherein the information received from the server includes a skip flag, and a first value or a second value is recorded in the skip flag;
   checking, by the display apparatus, the skip flag included in the information received from the server;
   in response to the second value being recorded in the skip flag, checking the setting of the output mode;
   in response to the output mode being a first mode according to the checking of the setting of the output mode, displaying an object about the received information, the object including a graphic item included in the received information and a graphic icon to enter a second mode, and in response to the output mode being the second mode according to the checking of the setting of the output mode, displaying detailed information of the received information on the screen, the detailed information including the graphic item and additional information of the graphic item; and
   in response to the first value being recorded in the skip flag, displaying the object including the graphic item included in the received information and the graphic icon to enter the second mode regardless of whether the set output mode is the first mode or the second mode.

2. The method of claim 1 further comprising:
   in response to the graphic icon being selected, displaying the additional information of the graphic item on the screen.

3. The method of claim 1 further comprising:
   in response to the graphic icon being selected, transmitting the additional information of the graphic item to a user terminal device.

4. The method of claim 1, wherein the output mode is set based on the output content.

5. The method of claim 1, wherein the output mode is set based on at least one of a channel providing the content, a genre of the content, and a user who watches the content.

6. The method of claim 1, further comprising:
   in response to the content being changed, displaying a user interface (UI) for receiving a setting of the output mode on the screen; and
   in response to the output mode being set through the UI, storing information of a set mode.

7. The method of claim 1, further comprising:
   automatically setting the output mode based on a setting history of the output mode.

8. The method of claim 1, wherein the graphic item corresponds to an image of an item included on the screen of the displayed content, and
   the graphic icon comprises a message inquiring whether to check for additional information of the item included on the screen, a first menu for inputting a user agreement with respect to the additional information of the item included on the screen, and a second menu for deleting the graphic item and the graphic icon.

9. The method of claim 8, wherein the additional information of the item included on screen comprises detailed information of the item included on the screen of the displayed content and information of at least one another item which belongs to a same category as the item included on the screen.

10. A content processing apparatus comprising:
    a signal processor configured to automatically extract a fingerprint of content output on a screen at predetermined time intervals;
    a communication unit configured to transmit the extracted fingerprint to a server and receive information corresponding to the content based on the transmitted fingerprint from the server, wherein the information received from the server includes a skip flag, and a first value or a second value is recorded in the skip flag;
    a display configured to display a user interface (UI) for receiving a setting of an output mode of the information received from the server; and
    a controller configured to check the skip flag included in the information received from the server, and in response to the second value being recorded in the skip flag, check the setting of the output mode, and in response to the output mode being a first mode according to the checking of the setting of the output mode, display an object about the received information, the object including a graphic item included in the received information and a graphic icon to enter a second mode, and in response to the output mode being the second mode according to the checking of the setting of the output mode, display detailed information of the received information on the screen, the detailed information including the graphic item and additional information of the graphic item,
    wherein the controller is further configured to, in response to the first value being recorded in the skip flag, display the object including the graphic item included in the received information and the graphic icon to enter the second mode regardless of whether the set output mode is the first mode or the second mode.

11. The apparatus of claim 10, wherein, in response to the graphic icon being selected, the controller is configured to control the display to display the additional information of the graphic item.

12. The apparatus of claim 10, wherein, in response to the graphic icon being selected, the controller is configured to transmit the additional information of the graphic item to a user terminal device.

13. The apparatus of claim 10, wherein the output mode is set based on the output content.

14. The apparatus of claim 10, wherein the output mode is set based on at least one of a channel providing the content, a genre of the content, and a user who watches the content.

15. The apparatus of claim 10 further comprising:

a storage configured to store a setting of the output mode, wherein, in response to the content being changed, the controller is configured to control the display to display the user interface (UI) for receiving a setting of the output mode, and in response to the output mode being set through the UI, store information of a set mode.

16. The apparatus of claim 10, wherein the controller is configured to set the output mode automatically based on a setting history of the output mode.

17. The apparatus of claim 10, wherein the graphic item corresponds to an image of an item included on the screen, and the graphic icon comprises a message inquiring whether to check for additional information of the item included on the screen, a first menu for inputting a user agreement with respect to the additional information the item included on the screen, and a second menu for deleting the graphic item and the graphic icon.

18. The apparatus of claim 17, wherein the additional information the item included on the screen comprises detailed information of the item included on the screen and information on at least one another item which belongs to a same category as the item included on the screen.

* * * * *